United States Patent Office 3,248,969
Patented May 3, 1966

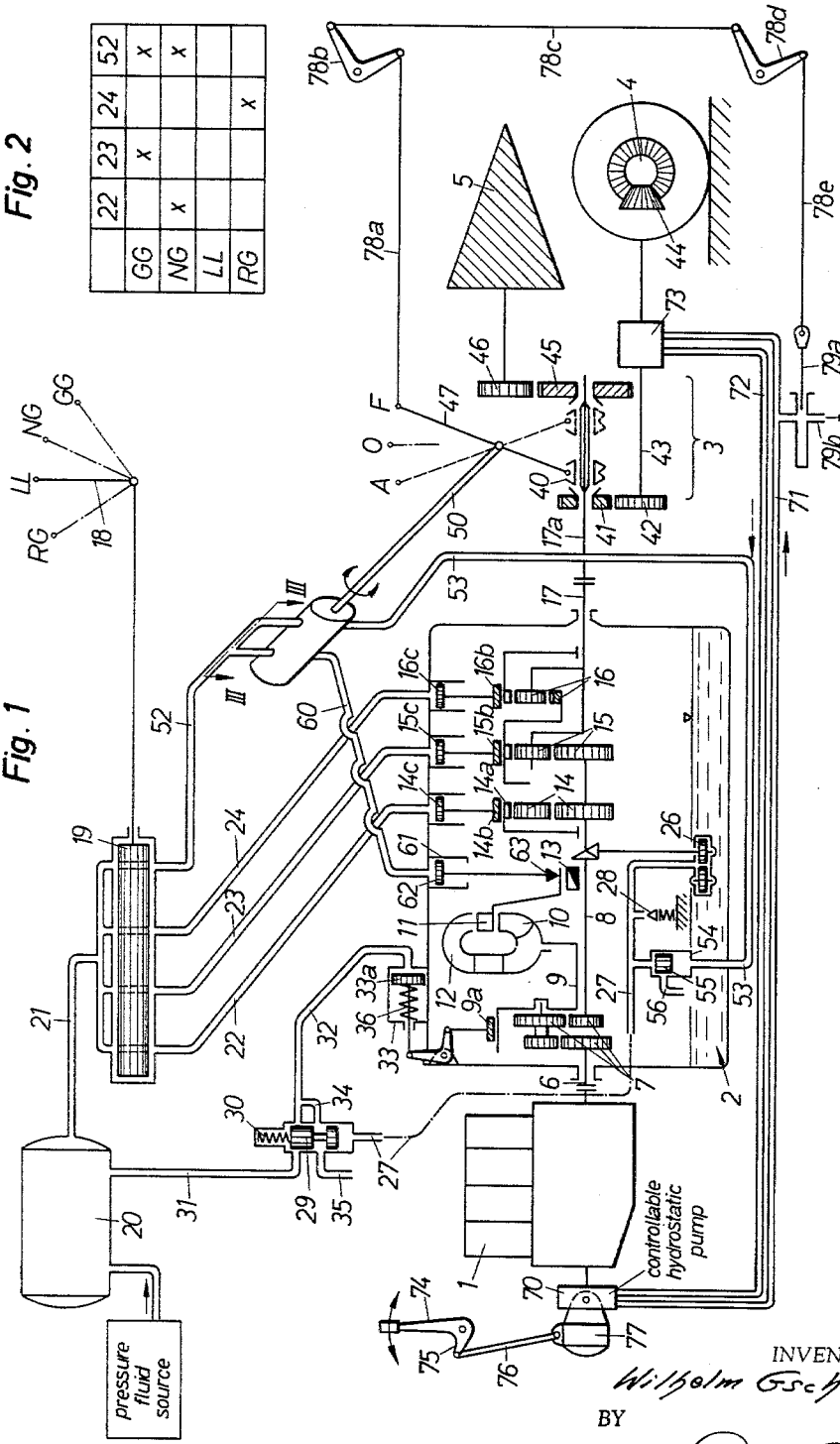

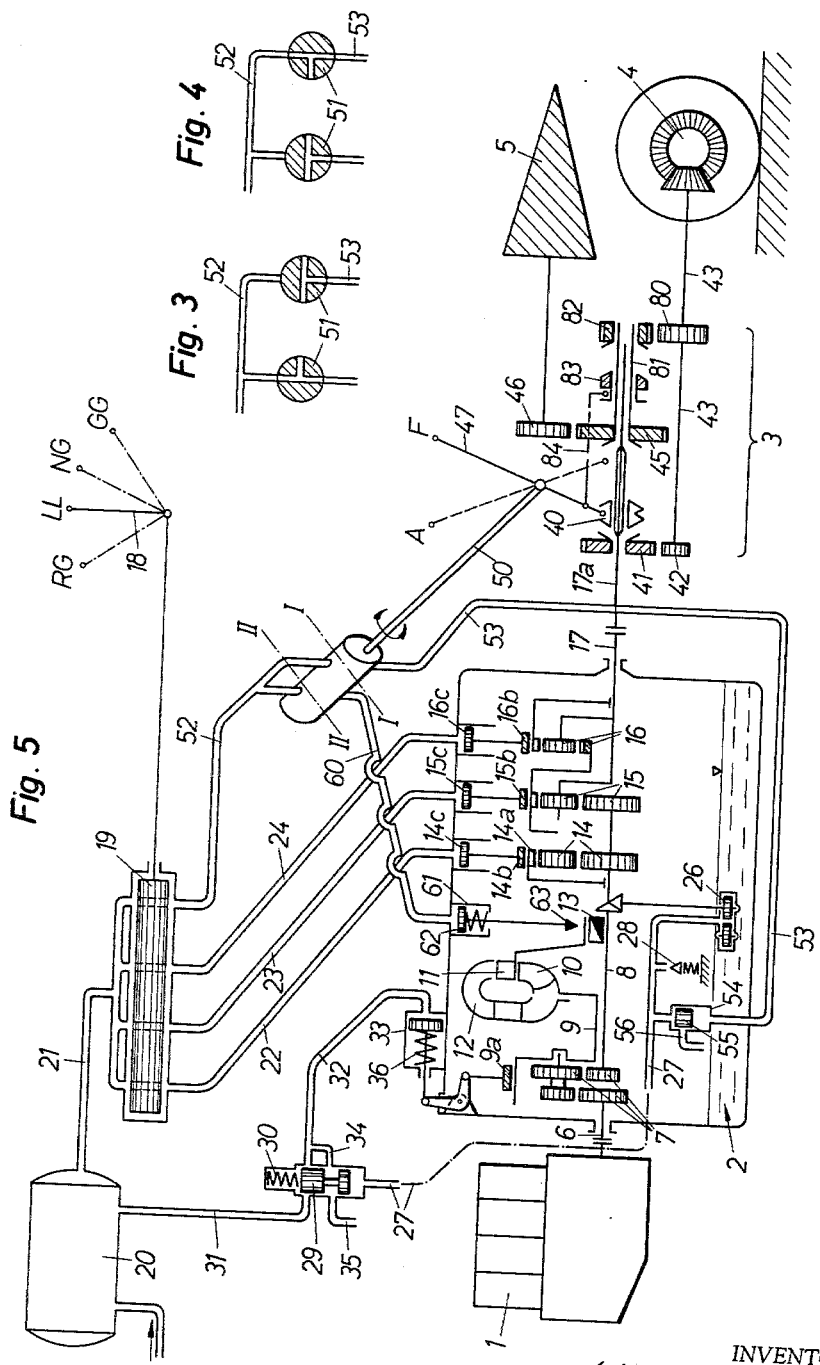

3,248,969
POWER TRANSMISSION ARRANGEMENT FOR SELF-PROPELLED VEHICLES WITH MACHINE TO BE DRIVEN THEREBY
Wilhelm Gsching, Heidenheim, Germany, assignor to Voith-Getriebe KG., Heidenheim (Brenz), Germany
Filed Sept. 24, 1962, Ser. No. 225,824
Claims priority, application Germany, Sept. 29, 1961, V 21,383
12 Claims. (Cl. 74—664)

The present invention relates to a power transmission arrangement for a self-propelled vehicle the driving engine of which is adapted through a speed change transmission selectively to be connected with the driving mechanism for moving the vehicle and/or with a machine to be driven by the driving engine, particularly a machine with irregular or shock-wise load. As an example of such machine, an earth digger or ditch digging machine may be mentioned which is connected to the self-propelled vehicle and may be driven by the engine for the latter. With such a vehicle, frequently two or even three different types of operations with highly different requirements may occur namely:

(a) A mere driving operation for instance for driving to and from the working place. Such a mere driving operation occurs on a street or highway and, therefore, it is desirable that the vehicle will be able to drive at relatively high speed and a high degree of efficiency.

(b) A sole working operation which means that the vehicle is at a standstill and that the driving engine for the vehicle operates the digging machine under load irregularly and in part shock-wise. This may be due to uneven ground, changing digging depth or because the digging machine hits upon rocks. Therefore, such sole working operation should be as soft and shock-absorbing as possible.

(c) Mixed operation. In numerous instances a mixed operation, i.e. a working and simultaneously driving operation is necessary, namely when at low driving speed a ditch is to be dug. For such an operation substantially the same requirements should be met as mentioned above under (b).

It is, therefore, an object of the present invention to provide a power transmission arrangement of the general type set forth above by means of which it will be possible to operate smoothly and in a shock-absorbent manner when operating the vehicle equipped with the power transmission arrangement in a power working operation as well as in mixed operation.

It is a further object of this invention to provide a power transmission arrangement as set forth in the preceding paragraph, which will permit operation of the transmission also by unskilled operators without the danger of damaging the arrangement.

These and other objects and advantages of the invention will appear more clearly from the following specification in connection with the accompanying drawings, in which:

FIG. 1 diagrammatically illustrates a transmission arrangement according to the present invention for driving an earth digging device, said arrangement being provided with a differential torque converter transmission and a distributing transmission as well as with a hydrodynamic transmission arranged in parallel to said first mentioned two transmissions.

FIG. 2 diagrammatically illustrates the control diagram for a control valve shown in FIG. 1.

FIG. 3 is a section along the line III—III of FIG. 1.

FIG. 4 is a section along the line III—III of FIG. 1, but with the valve in a position different from that of FIG. 3.

FIG. 5 shows a modified distributing transmission.

*General arrangement*

The present invention is based on a power transmission known per se for self-propelled vehicles, in which the driving mechanism and also the machine to be driven by the driving engine for the vehicle may be driven selectively individually or simultaneously through a speed change transmission which comprises a lower velocity range with at least partial hydrodynamic power transmission, and also comprises an upper purely mechanical velocity range. The hydrodynamic velocity range may be fully or partially hydraulic which means that either the entire output or only a branch of the power flow is conveyed through a fluid circuit as for instance fluid flow coupling or fluid flow converter.

In conformity with the present invention, the power transmission and/or the control device therefor is so designed, for instance by means of suitable locking means on the control device, that it will be possible to drive the machine, for instance earth working machine, merely within the hydrodynamic velocity range of the change transmission.

The considerably changing or shock-like loads of the working operation will with an arrangement according to the invention for all practical purposes not be able to damage the driving engine or the machine to be driven by the driving engine inasmuch as the fluid circuit of the hydrodynamic velocity range is always effective during the working of said machine and thus will act in a shock reducing or absorbing manner, and if the working tool is blocked completely for instance if the earth working machine jams in rock, an overload or a break in the driving installation will be prevented. When the arrangement is adjusted for a working operation, an accidental engagement of the purely mechanical velocity range will be impossible with the arrangement of the present invention. On the other hand, the purely mechanical velocity range of the change transmission which is engaged during a power driving operation, will make it possible to drive the vehicle at relatively high speed and high degree of efficiency. It is, of course, also to be understood that when the vehicle has to move over difficult terrain it is also possible to drive by means of the hydrodynamic velocity range which may have certain advantages in certain circumstances. Inasmuch as the operation of the device according to the invention requires less attention and skill, also operators with less experience than was heretofore required will be able to operate an arrangement according to the present invention.

The change transmissions customary with vehicles and comprising a hydrodynamic or partially hydrodynamic velocity range and a purely mechanical velocity range are frequently equipped with automatic speed range shift in order in this way to assure a shifting from one velocity range to the other velocity range at the proper phase of operation. Such transmission designs may advantageously be employed in connection with the present invention. In such an instance, during a power driving operation, the change transmission and automatic shift will be effective to advantage, whereas when the working machine is engaged or made effective, the engagement of the purely mechanical velocity range will be prevented by the mechanism according to the invention. It is highly advantageous in connection with the present invention to design the change transmission as a differential torque transmission which shifts automatically in response to a certain speed, i.e. transmission with power distribution and a torque converter arranged in one of the power branches. A transmission of this type makes it possible to obtain the advantages of the hydrodynamic power transmission namely a soft and shock-free operation, and high starting pulling forces as well as high degrees of efficiency, especially in the purely mechanical velocity range.

With the above mentioned differential torque converter transmissions, the turbine wheel is frequently connected to the transmission output shaft through a free wheel drive for the purpose that when the hydraulic power branch is ineffective or when a high output speed prevails, the turbine wheel will detach itself from the output shaft and will together with the remaining converter blade wheels rest for instance at a standstill. This is important in particular for a high transmission degree of efficiency. With the above mentioned working range, under considerably changing loads and consequently under considerably varying output speeds, such free wheel drive would rapidly engage and disengage with the result that it would wear out prematurely and be destroyed relatively soon.

Therefore, in order to avoid drawbacks of this type, according to a further development of the invention, locking means are provided which when the working machine is engaged, will lock the free wheel drive in its power transmitting position.

Furthermore, it is advantageous to provide a distributing transmission, preferably a mechanical distributing transmission, which is shiftable at random and follows the change transmission or differential torque transmission. Such a mechanical distributing transmission should comprise a shifting position for the driving connection to the driving mechanism and should have at least a further shifting position for the driving connection to the working machine or to the driving mechanism and to the working machine. In this connection, it is advantageous to connect the selectively operable shifting member of such distributing transmission with the velocity control of the change transmission in such a way that when actuating said shifting member for operation of the working machine, the change transmission will always automatically be shifted for the hydrodynamic velocity range.

In some instances of employment, for instance when the machine to be driven by the vehicle driving engine is an earth digging machine, with the working machine working there is at the same time required a rather low driving speed for crawling, which low driving speed must additionally be controllable. In order to meet this requirement, according to the present invention there is additionally provided a hydrostatic transmission preferably an infinitely variable hydrostatic transmission which serves solely for the drive when the working machine is made effective and which is arranged in parallel to the change transmission or with the change transmission and the distributing transmission. By means of such hydrostatic transmission, even the lowest crawling speeds can be controlled in a sensitive manner.

In order with the last mentioned arrangement to prevent any possible faulty control in driving operation, there is additionally suggested to provide means which will permit engaging the hydrostatic transmission only when interrupting the driving connection between change transmission and driving mechanism. It will then be impossible that the engine operates simultaneously through the hydrodynamic transmission and through the hydrostatic transmission upon the driving mechanism.

*Structural arrangement*

Referring now in detail to the drawing, the driving arrangement illustrated in FIG. 1 and intended for an earth digging machine comprises a diesel engine 1. This diesel engine is operable through the differential torque converter transmission 2 and the distributing transmission 3 selectively to drive either the driving mechanism—driving axle 4—of the vehicle or the earth digging device 5.

The differential torque converter transmission 2 is of standard construction and has its input shaft provided with power dividing planetary gear transmission 7. When the band brake 9a is disengaged, at said planetary gear transmission 7, the power flow is split up so as to pass on one hand through a purely mechanical power path comprising intermediate shaft 8, and through a hydraulic power path comprising a hollow shaft 9, pump wheel 10 and turbine wheel 11 of the flow converter 12 and the free wheel drive 13. This represents the partially hydraulic condition of operation inasmuch as in this instance the motor output is partially hydraulically transmitted through the torque converter 12 and partially mechanically through the intermediate shaft 8. In this way, in addition to a good torque conversion—high starting torques—all advantages of a hydraulic power transmission such as shock and oscillation absorption etc. will be obtained.

If, however, the brake 9a is engaged so that pump wheel 10 and the entire hydraulic power branch 9-13 is made ineffective, the power transmission is now effected solely mechanically through the intermediate shaft 8. This represents the purely mechanical condition of operation which operates at a high degree of efficiency and is intended for the higher velocity driving range.

The control of the band brake 9a at the power dividing planetary gear transmission 7, and thus the shifting from hydraulic to the purely mechanical operation, and vice versa, is effected automatically (in view of the locking device to be described later, however, only with power driving operation), so as to be independent of possible mistakes by the vehicle conductor. To this end, a metering oil pump 26 driven by the intermediate shaft 8 produces a speed dependent pressure which through conduit 27 (with high pressure valve 28) controls the control piston or valve spool 29 in cooperation with a pressure spring 30 in such a way that the valve spool 29 at low speeds of shaft 8 occupies its lowest position. In this position compressed air passes through conduits 31, 32 to the control cylinder 33, displaces the piston 33a thereof toward the left and thus disengages brake 9a. Transmission 2 will then operate with power division and partially hydraulically. At high speeds of intermediate shaft 8, and consequently at high oil pressure in conduit 27 and in the uppermost position of piston 29 (this position is shown in FIG. 1), conduit 32 is vented through conduits 34, 35, and brake 9a is engaged in view of the effect of pressure spring 36. In this instance the hydraulic power path 9-13 of the differential converter transmission is made ineffective, and the power transmission is effected purely mechanically.

The intermediate shaft 8 is followed by a three-speed mechanical change transmission unit with three planetary gear sets 14, 15 and 16. When the outer gear ring 14a of the first mentioned planetary gear set 14 is braked fast by band brake 14b, a speedup from intermediate shaft 8 to output shaft 17—fast forward speed—will be obtained which speedup will henceforth be designated as normal speed. If, however, the band brake 15b or 16b is engaged so that the corresponding outer gear ring of the planetary gear sets 15 and 16 is braked fast, a low forward speed or a rearward speed will be obtained. This low forward speed may be employed when driving in hilly country or cross country. Each of the three last mentioned velocity speeds or velocity ranges may be obtained hydro-mechanically, namely when brake 9a is disengaged, or purely mechanically when the brake 9a is engaged, so that with this differential torque converter transmission, a total of six velocity ranges may be obtained namely three partially hydraulic and three purely mechanical velocity ranges.

The control of the planetary gear sets 14, 15 and 16 is effected at random by actuating the control lever 18 which is operable by the vehicle conductor. In the illustrated position LL of this control lever 18, the rotary valve member 19 connected to its tilting axle occupies such a position that the supply of compressed air from a pressure fluid source (not shown) and from the compressed air container 20 through conduits 21, 22, 23, 24 to the compressed air control cylinders 14c, 15c and 16c of the band brakes 14b, 15b, 16b will be interrupted. In this instance, all three brakes 14b, 15b and 16b are disengaged, and the driving connection between intermediate shaft 8 and output shaft 17 is interrupted. This represents the idling-control condition of the differential torque converter transmission. When the control lever 18 occupies positions NG, GG or RG, a supply of compressed air through conduits 22, 23 or 24 to the compressed air control cylinders 14c, 15c or 16c is freed so that accordingly, brake 14b, 15b or 16b is engaged. This corresponds to the normal speed-street speed, the cross country speed and the rearward speed respectively. FIG. 2 illustrates the control diagram of the rotary valve member 29, while the letter $x$ indicates that the passage to the corresponding connecting conduit for instance conduit 22 is freed.

From the differential torque converter transmission 2, the power passes through shaft 17, 17a to the distributing transmission 3 and in the latter, when the coupling sleeve 40 occupies its left-hand position, through gears 41, 42 to the output shaft 43 which in its turn starts the vehicle driving axle 4 in motion through the bevel gear transmission 44. This represents a pure driving position. It may be added that the coupling sleeve 40 is axially displaceable on a wedge profile of shaft 17a.

If, however, coupling sleeve 40 occupies its right-hand end position, the power flow passes from coupling sleeve 40 through gears 45, 46 to the working machine 5. This corresponds to the working operation. The displacement of the coupling sleeve 40 is effected by means of a selector lever 47 whose positions F, O and A correspond to driving operation, idling, and working operation respectively.

With the design of the drive as described so far, the automatic control device 9a, 26-36 of the differential torque converter would at high speeds of the intermediate shaft 8 shift over to purely mechanical operation also when the distributing transmission 3 is adjusted for working operation. This, however, is to be avoided in view of the dangers outlined in the introductory portion to the specification. Therefore, in conformity with the present invention, the tilting axle 50 of the selector lever 47 is coupled to a rotary valve 51 which controls the passage for the compressed air from conduits 21, 52 to conduit 53. The last mentioned conduit leads to cylinder 54 with relief piston 55 which in its turn controls an outlet from the pressure conduit 27 of the metering oil pump 26 to the oil sump. If now the selector lever 47 is in position A for operation of the working machine, the passage of the compressed air from conduit 52 to conduit 53 is interrupted (see corresponding section III—III (FIG. 1) through control valve 51 in FIG. 3) so that the relief piston 55 will occupy its lowermost position, and the pressure conduit 27 of the pump 26 will be connected with the oil sump. Even at high speed of intermediate shaft 8 no pressure will then be able to develop in pressure conduit 27 so that now, as desired, the automatic shift-over of the differential torque converter transmission to purely mechanical operation will be prevented. In positions F (driving operation) and O (idling) of the operation selector lever 47, the passage 52–53 is freed (see corresponding section (FIG. 4) through rotary valve 51 in FIG. 1) so that in this instance compressed air passes from the container 20 through conduits 21, 52 and 53, presses the relief piston 55 upwardly and thus shuts off the outlet conduit 56. This means that during driving operation, the automatic shift-over of the differential torque converter transmission to the mechanical driving range will not be interrupted.

The control valve 51 additionally controls the passage of compressed air from conduit 52 through conduit 60 to compressed air cylinder 61 the piston 62 of which actuates the blocking device 63 indicated only in the drawing, and then locks the free wheel drive 13 in its engaged position namely at the lowermost position of piston 62 or unlocks said free wheel drive namely in the uppermost piston position. The control passages in the control valve 51 are so arranged that in working operation (position A of the selector lever 47) the supply of compressed air through conduits 52, 60 to cylinder 61 will be freed (see cross section III—III of FIG. 1 of control valve 51 in FIG. 3), so that the free wheel drive is locked in its power transmitting position. Even if the load of the working machine should greatly vary and consequently rather varying speeds are encountered or at a temporary relief of the working machine shaft, the turbine wheel 11 cannot detach itself through free wheel drive 13 from intermediate shaft 8 so that this free wheel drive 13 will not be unduly stressed.

In positions O idling and F driving operation of the selector lever 47, however, the connection between conduits 52 and 60 is interrupted (valve position according to II—II of FIG. 4), and the free wheel lock 63 is made ineffective. This means that in this instance the free wheel drive 13 permits a disengagement of the turbine wheel 11 from intermediate shaft 8 as it is required for an effective and efficient driving operation.

It is sometimes also necessary that the free wheel lock 63 be employed during driving operation namely for the purpose of braking. In this instance, for instance, the supply to the compressed air cylinder 62 may additionally by means of a device (not illustrated) be controlled in conformity with the position of a brake lever in such a way that during braking operation, the free wheel drive 13 will likewise be blocked in its power transmitting position so that the turbine wheel 11 carried along by the intermediate shaft 8 will, due to the watt work in the flow converter 12, act in a braking manner.

The supply conduit 52 for compressed air is not acted upon permanently by compressed air but due to a corresponding design of the control passages in control valve 19, only in the positions GG and MG of the velocity lever 18 (see right-hand column of control diagram of FIG. 2). When shifting the speed velocity lever 18 to idling and rearward speed, conduit 52 will be pressureless so that in this instance already from the start, i.e. independently of the position of lever 47, the free wheel lock 63 is made ineffective, and the automatic transmission shift to the hydraulic operation is blocked, the relief piston 55 occupying its lower position.

Also this aids in a safe operation of the drive.

In numerous instances, when the earth digging machine 5 is engaged, also a very slow driving movement or feed of the vehicle is required while this movement preferably must also be controllable, especially independently of the working machine speed. To this end, a separate hydrostatic transmission of standard design is provided the hydrostatic pump 70 of which is directly coupled to the diesel engine 1 and communicates through pressure conduit 71 and suction conduit 72 with the hydrostatic motor 73. Motor 73 directly drives the output shaft 43. For purposes of controlling the crawling movement of the vehicle, either pump 70 or hydrostatic motor 73 may be controllable in an infinitely variable manner by a hand-actuated lever 74 which is connected by lever 75 and rod 76 to the adjustable part 77 of the controllable hydrostatic pump 70 for instance. In that way the crawling speed may be adapted to the soil condition in a fine sensitive manner.

FIG. 5 shows a transmission similar to that of FIG. 1 but with a modification of the distributing transmission. This is intended for a drive without hydrostatic crawling transmission while the crawling drive of the vehicle with the earth digging machine in operation is effected simultaneously with the machine drive through the distributing transmission. To this end, in addition to the elements of the distributing transmission according to FIG. 1, there is provided a gear 80 keyed to output shaft 43 and a gear 82 meshing with gear 80 and freely rotatable on hollow shaft 81. Hollow shaft 81 is firmly connected to gear 45 and carries an axially displaceable coupling sleeve 83 which is rigidly coupled in the direction of rotion to said hollow shaft. Coupling sleeve 83 is adapted to be actuated by lever 47 through the intervention of connecting rod 84 and is furthermore adapted to be coupled to gear 82. The remaining elements 1 to 63 of this distributing transmission correspond to those of FIG. 1 and therefore have been designated with the same reference numerals as in FIG. 1.

When selector lever 47 occupies position F and consequently the coupling sleeves 40 and 83 occupy their left-hand positions, the power flow passes through elements 17a, 40, 41, 42, and 43 to the vehicle driving axle 4. This represents the power driving operation only. When lever 47 occupies position A and consequently the coupling sleeves 40 and 83 occupy their right-hand positions, a branch of the power flow passes through 17a, 40, 45, 46 to working machine 5, whereas a second branch passes through 17a, 40, 81, 83, 82, 80, 43 to vehicle driving axle 4. This represents the working position with slow crawl-driving movement. The pair of gears 82, 80 is with regard to the diameter thereof designed for such a slow stepdown transmission ratio that the low vehicle feed speed will be obtained which is required for the working operation.

It is, of course, to be understood that the present invention is, by no means, limited to the particular constructions shown in the drawings but also comprises any modifications within the scope of the appended claims.

What I claim is:

1. A power transmission arrangement for a vehicle having driving axle means and a connecting shaft for connection with a working machine, and also having an engine for driving said driving axle means and said connecting shaft and thereby said working machine, which comprises: a speed change transmission having a lower velocity range with an at least partially hydrodynamic power path and also having an upper velocity range with a purely mechanical power path, said speed change transmission also including output shaft means for driving connection with said driving axle means and said connecting shaft, control means operable operatively to connect said output shaft means selectively with said driving axle means or simultaneously with both said driving axle means and said connecting shaft, and means associated with said control means for permitting driving connection of said output shaft means with said connecting shaft through said hydrodynamic power path only.

2. A power transmission arrangement according to claim 1, in which said speed change transmission comprises additional control means for automatically controlling said speed change transmission.

3. A power transmission arrangement according to claim 2, in which said additional control means comprises means responsive to the speed of a shaft of said speed change transmission.

4. A power transmission arrangement for a vehicle having driving axle means and a connecting shaft for connection with a working machine, and also having an engine for driving said driving axle means and said connecting shaft and thereby said working machine, which comprises: a speed change transmission having a lower velocity range with an at least partially hydrodynamic power path and also having an upper velocity range with a purely mechanical power path, said speed change transmission also including output shaft means for driving connection with said driving axle means and said connecting shaft, said hydrodynamic power path including a differential torque converter transmission having its turbine wheel drivingly connected to said output shaft means, free wheel means interposed between said turbine wheel and said output shaft means, locking means operable in response to the driving engagement of said connecting shaft for locking said free wheel means in its power transmitting position, control means operable operatively to connect said speed change transmission selectively with said driving axle means or simultaneously with both said driving axle means and said connecting shaft, and means associated with said control means for permitting driving connection of said speed change transmission with said connecting shaft through said hydrodynamic power path only.

5. An arrangement according to claim 1, which includes a distributor transmission interposed between said speed change transmission and said driving axle means and said connecting shaft, and shift means operatively connected to said distributor transmission and operable selectively for moving said distributor transmission into a position for driving connection between said engine and said driving axle means and also into at least a further position for driving connection between said engine and said connecting shaft.

6. An arrangement according to claim 5, in which said shift means includes lever means and also includes means responsive to the movement of said lever means into a position for establishing driving connection between said engine and said connecting shaft to automatically make said hydrodynamic power path effective.

7. A power transmission arrangement for a vehicle having driving axle means and a connecting shaft for connection with a working machine and also having an engine for driving said driving axle means and said connecting shaft and through the latter said working machine, which comprises: a speed change transmission having a lower velocity range with an at least partially hydrodynamic power path and also having an upper velocity range with a purely mechanical power path, said speed change transmission also including output shaft means for driving connection with said driving axle means and said connecting shaft, control means operable operatively to connect said speed change transmission selectively with said driving axle means or said connecting shaft, means associated with said control means for permitting driving connection of said speed change transmission with said connecting shaft through said hydrodynamic power path only, hydrostatic transmission means operatively connected to said engine and said driving axle means and being arranged in parallel to said speed change transmission, said hydrostatic transmission means being operable to drive said driving axle means while said connecting shaft is being driven by said engine, and means associated with said hydrostatic transmission means for controlling the transmission ratio thereof.

8. An arrangement according to claim 7, which includes locking means operable to block said hydrostatic transmission means in response to an establishment of a driving connection between said speed change transmission and said driving axle means.

9. A power transmission arrangement for a vehicle having driving axle means and a connecting shaft for connection with a working machine and also having an engine for driving said driving axle means and said connecting shaft and through the latter said working machine, which comprises: a differential torque converter transmission including an input shaft for driving connection with said engine and also including a power dividing planetary gear transmission associated with said input shaft whereby an hydrodynamic power path and a purely mechanical power path are provided, control means associated with said differential torque converter transmission and operable to selectively shift the latter from simultaneous driving operation through said hydrodynamic power path and said mechanical power path to driving operation through said purely mechanical power path only and vice versa, automatic means for automatically controlling said control means, multi-speed mechanical speed change means interposed between said differential torque converter transmission on one hand and said driving axle means and said connecting shaft on the other hand for varying the transmission ratio therebetween, distributor transmission means interposed between said multispeed mechanical speed change means on one hand and said driving axle means and said connecting shaft on the other hand, selector lever means operatively connected to said distributor transmission means, and valve means operatively connected to said selector lever means and operable to nullify the action of said automatic control means in response to a certain position of said selector lever means.

10. A power transmission arrangement according to claim 9, which includes a hydrostatic transmission drivingly connecting said engine to said driving axle means while bypassing all of the other transmissions, and means associated with said hydrostatic transmission for varying the transmission ratio thereof and thereby the speed of said driving axle means.

11. An arrangement according to claim 1, in which said speed change transmission is a mechanical hydrodynamic change transmission with automatic shift control.

12. A power transmission arrangement for a vehicle having driving axle means and a connecting shaft for connection with a working machine, and also having an engine for driving said driving axle means and said connecting shaft and thereby said working machine, which comprises: a speed change transmission having a lower velocity range with an at least partially hydrodynamic power path and also having an upper velocity range with a purely mechanical power path, said speed change transmission also including output shaft means for driving connection with said driving axle means and said connecting shaft, control means operable operatively to connect said output shaft means selectively with said driving axle means or with said connecting shaft, and means associated with said control means for permitting driving connection of said output shaft means with said connecting shaft through said hydrodynamic power path only.

References Cited by the Examiner
UNITED STATES PATENTS

| 2,618,979 | 11/1952 | Benning | 74—15.4 |
| 2,729,435 | 1/1956 | Harbers et al. | 74—664 X |
| 3,065,643 | 11/1962 | Mark et al. | 74—15.4 X |

DON A. WAITE, *Primary Examiner.*
DAVID J. WILLIAMOWSKY, *Examiner.*